US012746831B2

(12) United States Patent
Qualich et al.

(10) Patent No.: US 12,746,831 B2
(45) Date of Patent: Sep. 29, 2026

(54) LATCH DUAL-CURVE 3PS/6SO SAFE STATE FOR INVERTER

(71) Applicant: Vitesco Technologies USA, LLC, Auburn Hills, MI (US)

(72) Inventors: John R. Qualich, Buffalo Grove, IL (US); Isaac Gewarges, Schaumburg, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 18/808,677

(22) Filed: Aug. 19, 2024

(65) Prior Publication Data

US 2026/0048670 A1 Feb. 19, 2026

(51) Int. Cl.
*B60L 50/51* (2019.01)
*B60L 3/00* (2019.01)
*H02P 29/032* (2016.01)

(52) U.S. Cl.
CPC ............... *B60L 50/51* (2019.02); *B60L 3/003* (2013.01); *B60L 3/0061* (2013.01); *B60L 3/0084* (2013.01); *H02P 29/032* (2016.02); *B60L 2210/42* (2013.01); *B60L 2240/421* (2013.01); *B60L 2260/26* (2013.01)

(58) Field of Classification Search
CPC .... B60L 2210/40; B60L 3/0023; B60L 3/003; B60L 3/0061; B60L 50/51; B60L 3/0069; B60L 15/007; B60L 2240/421; B60L 2240/423; B60L 3/04; B60L 3/06; H02P 27/06; H02P 3/22; H02P 29/032; H02P 29/024
See application file for complete search history.

(56) References Cited

U.S. PATENT DOCUMENTS

2011/0186366 A1* 8/2011 Heller ........................ B60L 1/00 307/10.1
2024/0116377 A1* 4/2024 Wu ......................... B60L 53/53

* cited by examiner

*Primary Examiner* — Ryan Johnson

(57) ABSTRACT

A method of operating an EV in one of various states provides an inverter control system having a high voltage circuit powered by a high DC voltage power source; a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor. Upon powerup of the high voltage circuit and with the low voltage circuit being unpowered, the method establishes an emergency tow state with each of the high side switches and each of the low side switches being open permitting the EV to be towed without damaging the motor.

9 Claims, 5 Drawing Sheets

LATCH DUAL-CURVE 3PS/6SO SAFE STATE FOR INVERTER

FIELD

This invention relates to safe states of electric motor driven vehicles (EV) and, more particularly, to a system and method that preselects between a three phase short (3PS) curve control or six switch off (6SO) curve control based on operating conditions of the vehicle.

BACKGROUND

The existing safe states for electric motor driven vehicles are suitable for failures that occur while the vehicle is moving. Such safe states allow the vehicle to coast or gradually slow to a stop after the failure has occurred. However, if the vehicle is later towed with its drive motors on the pavement, the conventional 3PS safe state risks damage to the inverter due to being exposed to excessive heat and also risks damage to the motor.

There is a need to provide a system and method that preselects between a three phase short (3PS) curve control or six switch off (6SO) curve control based on operating conditions of an electric motor driven vehicle such that a circuit powers up in a curve appropriate for safe state towing and latches to a curve appropriate to motor-driving upon detection of removal of a safe state signal.

SUMMARY

An objective of the invention is to fulfill the need referred to above. In accordance with the principles of an embodiment, this objective is achieved by a method of operating an EV in one of various states that provides an inverter control system having a high voltage circuit powered by a high DC voltage power source; a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor. Upon powerup of the high voltage circuit and with the low voltage circuit being unpowered, the method establishes an emergency tow state with each of the high side switches and each of the low side switches being open permitting the EV to be towed without damaging the motor.

In accordance with another aspect of an embodiment, the method further includes establishing an emergency tow state RPM threshold; during the emergency tow state, ensuring that the motor RPM is less than the emergency tow state RPM threshold; when low voltage circuit is powered-up and the microprocessor determines that the EV is no longer in the emergency tow state, exiting the emergency tow state; and after exiting the emergency tow state and prior to driving the traction motor, the microcontroller changes a state of a signal to latch a first safe state by opening each of the high side switches and each of the low side switches when the motor RPM is less than a first threshold that is substantially below emergency tow state RPM threshold, or to latch a second safe state by closing of all of the high side switches with all of the low side switches being open or closing all of the low side switches with all of the high side switches being open, when the motor RPM is greater than the first threshold and less than the emergency tow state RPM threshold.

In accordance with another aspect of an embodiment, an inverter control system for an EV includes a high voltage circuit powered by a high DC voltage power source; a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor. Wherein, upon powerup of the high voltage circuit with the low voltage circuit being unpowered, the inverter control system is configured to establish an emergency tow state with each of the high side switches and each of the low side switches being open, with a voltage of the high voltage circuit being less than a tow state voltage threshold.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 3 is a portion of the block diagram of FIG. 1, showing a 3PS safe state where all high side switches are OFF and all low side switches are ON.

DETAILED DESCRIPTION OF AN EXEMPLARY EMBODIMENT

Figure 1:
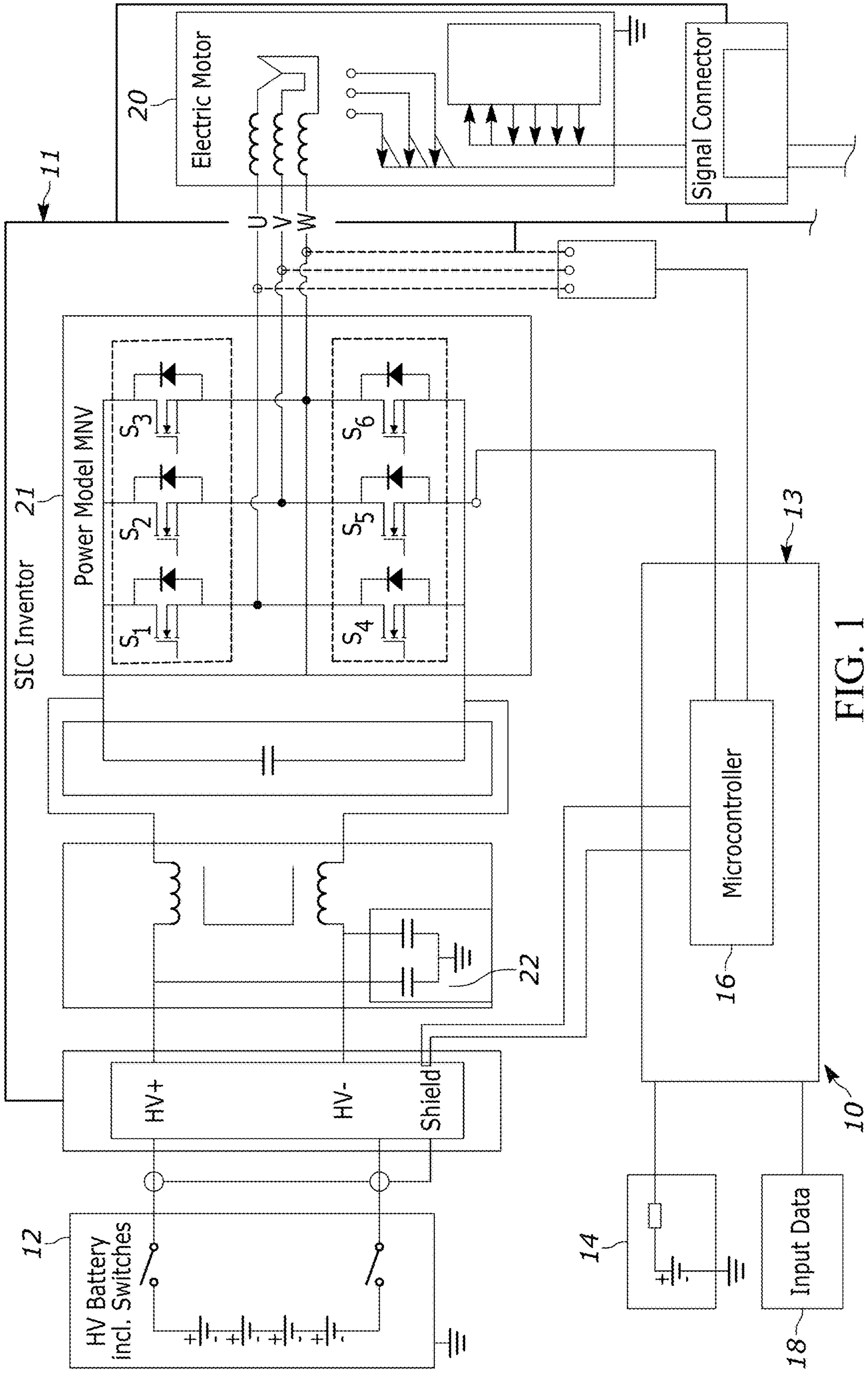
FIG. 1 is a block diagram of an inverter control system for a battery powered vehicle in accordance with an embodiment.

With reference to FIG. 1, a traction inverter control system of an EV is shown, generally indicated at 10, in accordance with an embodiment. The system 10 includes a high voltage circuit 11 that receives power from a DC high voltage (800V) source 12 and a low voltage circuit 13 that receives low DC voltage from a power sustain relay (PSR) or 12V source 14 of an EV. The main function of the system 10 is controlled by a microcontroller 16 that receives power from the 12V source 14 and input data 18 from the EV. The microcontroller 16 also monitors the voltage from high voltage circuit 11. The input data can be motor RPM, torque, voltages, vehicle CAN data, or other vehicle data. The 800V power source 12 provides some additional logic and energy to the system 10. In order for the inverter system 10 to work and propel the vehicle (by driving an AC electric motor 20), both the low voltage circuit 13 with microcontroller 16, and the high voltage circuit 11 need to function. If either is disabled or broken, then the system 10 goes into one of various safe states. These safe states are hardware-controlled and are suitable for failures that occur while the vehicle is moving, permitting the vehicle to coast or gradually slow to a stop after the failure has occurred. The traction motor 20 is a motor generator and can charge a rechargeable battery (an accumulator) such at DC voltage source 12.

Figure 2:
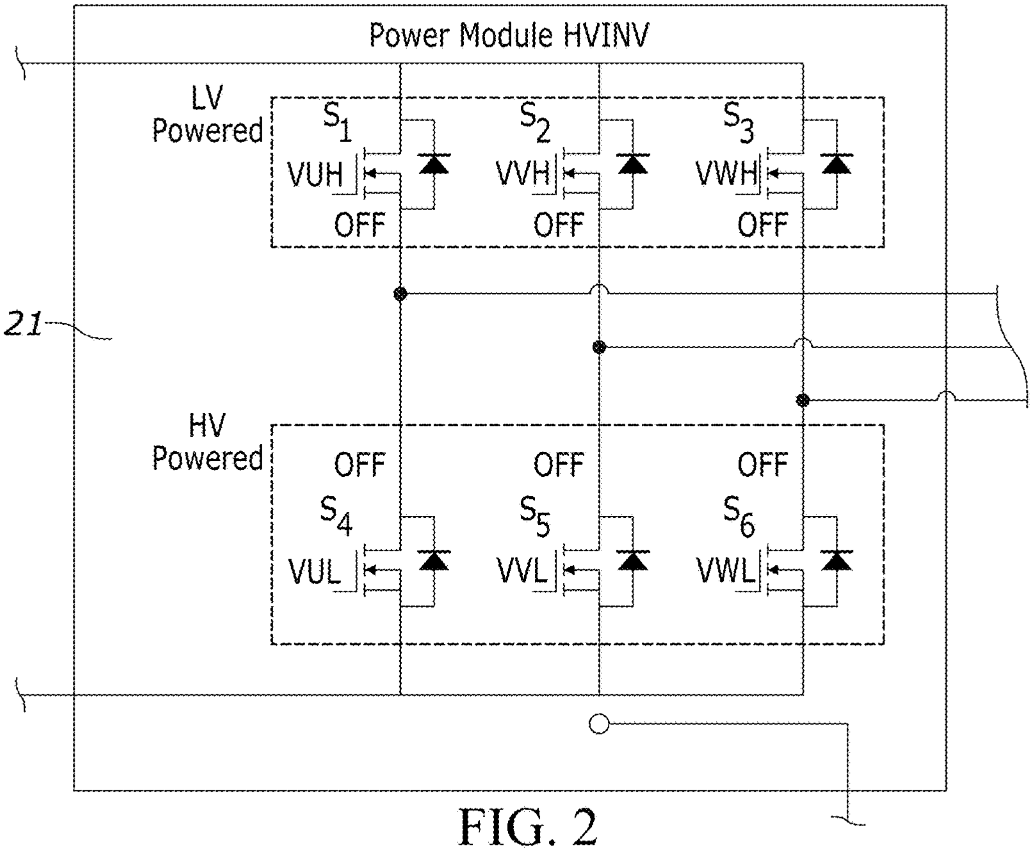
FIG. 2 is a portion of the block diagram of FIG. 1, showing a 6SO safe state or freewheeling mode where all switches are OFF.

The system 10 includes an inverter circuit 21 and with reference to FIG. 2, a freewheeling or six switch open (6SO) or first safe state of the circuit 21 is shown where the three phases of the driven motor 20 are open-circuited (high power switches $S_1$ to $S_6$ are all open or OFF). This first safe state is only acceptable at low speed (e.g., below 1000 RPM). It is a preferred safe state when the vehicle is stopped or at low speed. It is noted that due to intrinsic diodes of the SiC transistors (switches $S_1$ to $S_6$) used to drive the motor 20, it is not possible to be truly opened-circuited since there are diodes that can conduct current under certain conditions.

Figure 3:
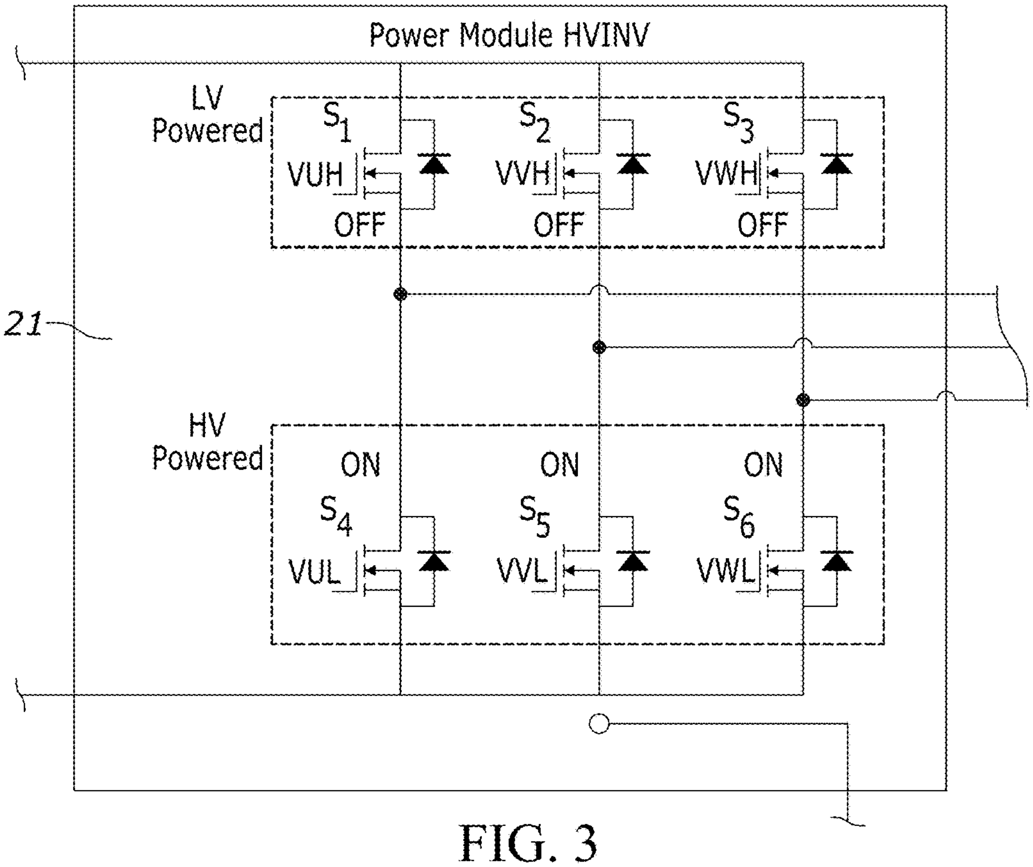

With reference to FIG. 3, a 3 phase short (3PS) or second safe state of the circuit 21 is shown where the three phase of the driven motor 20 are all connected (shorted together). FIG. 3 shows high side switches $S_4$ to $S_6$ as OFF while low side switches $S_1$ to $S_3$ are ON. It can be appreciated that the 3PS can be performed on either the low side or high side switches, e.g., alternatively, all of the high side switches $S_4$ to $S_6$ can be ON while all of the low side switches $S_1$ to $S_3$ are OFF. 3PS is also referred to as Active Short Circuit (ASC). This 3PS second safe state is the preferred safe state when the speed is high (e.g., above 1800 RPM) or unknown (loss of control). In the embodiment, a default condition is to have low side switches $S_1$ to $S_3$ to be ON as a hardware default, and only a subset of the hardware needs to be working and the low-voltage circuit 13 (microcontroller 16, safety logic, high side inverter circuit 21 power) do not need to be working. The high side switches $S_4$ to $S_6$ default to OFF.

Figure 4:
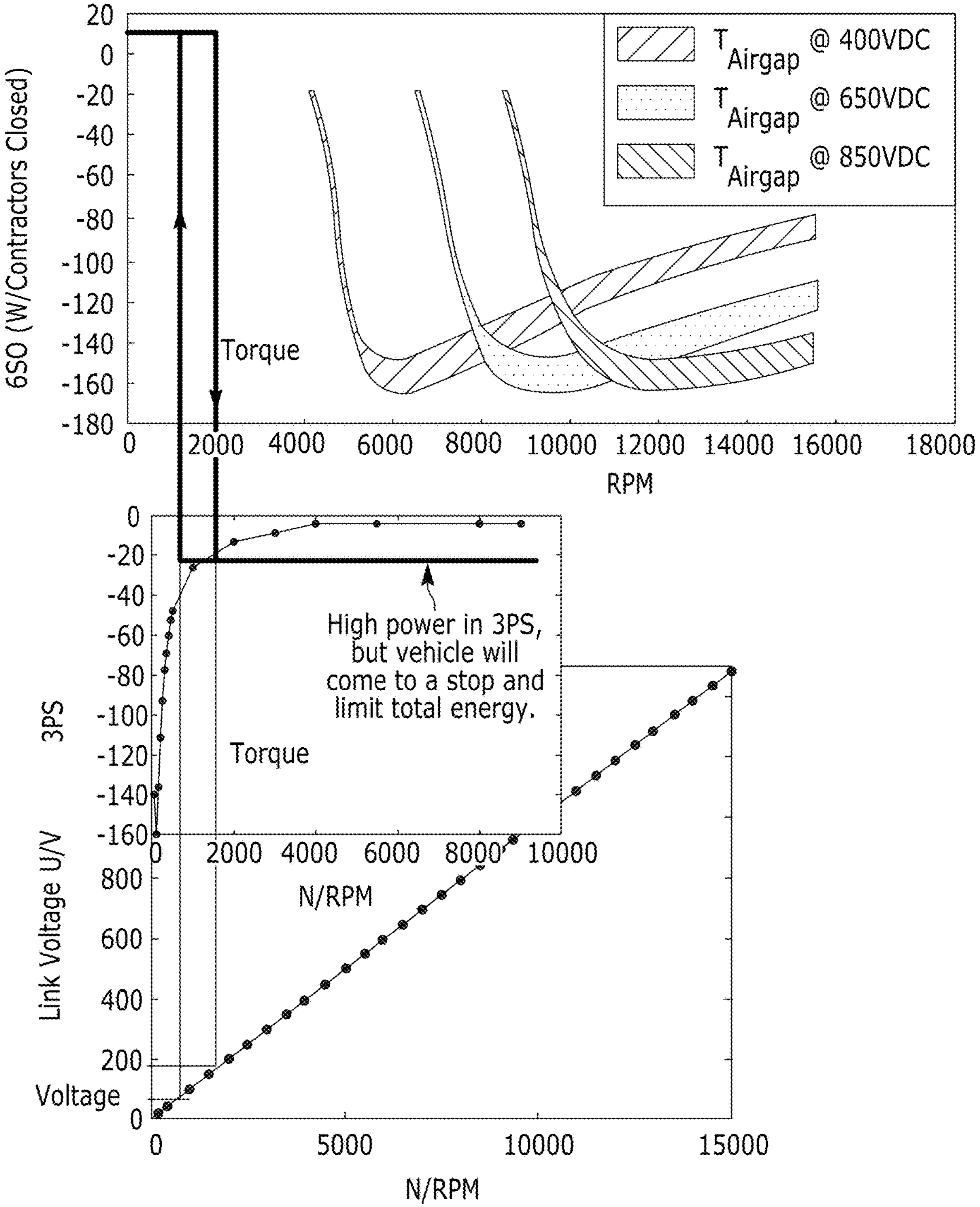
(Prior Art) FIG. 4
FIG. 4 is a is a graph of the operating region curve of a conventional traction inverter safe state for an EV during 3PS or 6SO safe states.

Conventionally, when the EV enters a safe state, only the 3PS or 6SO safe state is available. The EV must enter the safe state at low negative torque and sudden application of large negative torque is not permitted. With reference to FIG. 4, an operating curve of a conventional traction inverter safe state for an EV during 3PS or 6SO states is shown by the bold arrowed line. The "curve" is the state on one axis and voltage on the other axis. As shown, at low speeds (e.g., below 1000 RPM (80V), it is best to enter the 6SO safe state and at higher speeds (e.g., above 1800 RPM (180V), it is best to enter the 3PS safe state. It is noted that the RPM cannot be predicted at the time the EV fails and it is not known if the contactors (switches $S_1$ to $S_6$) are open or closed when failure occurs.

Figure 5:
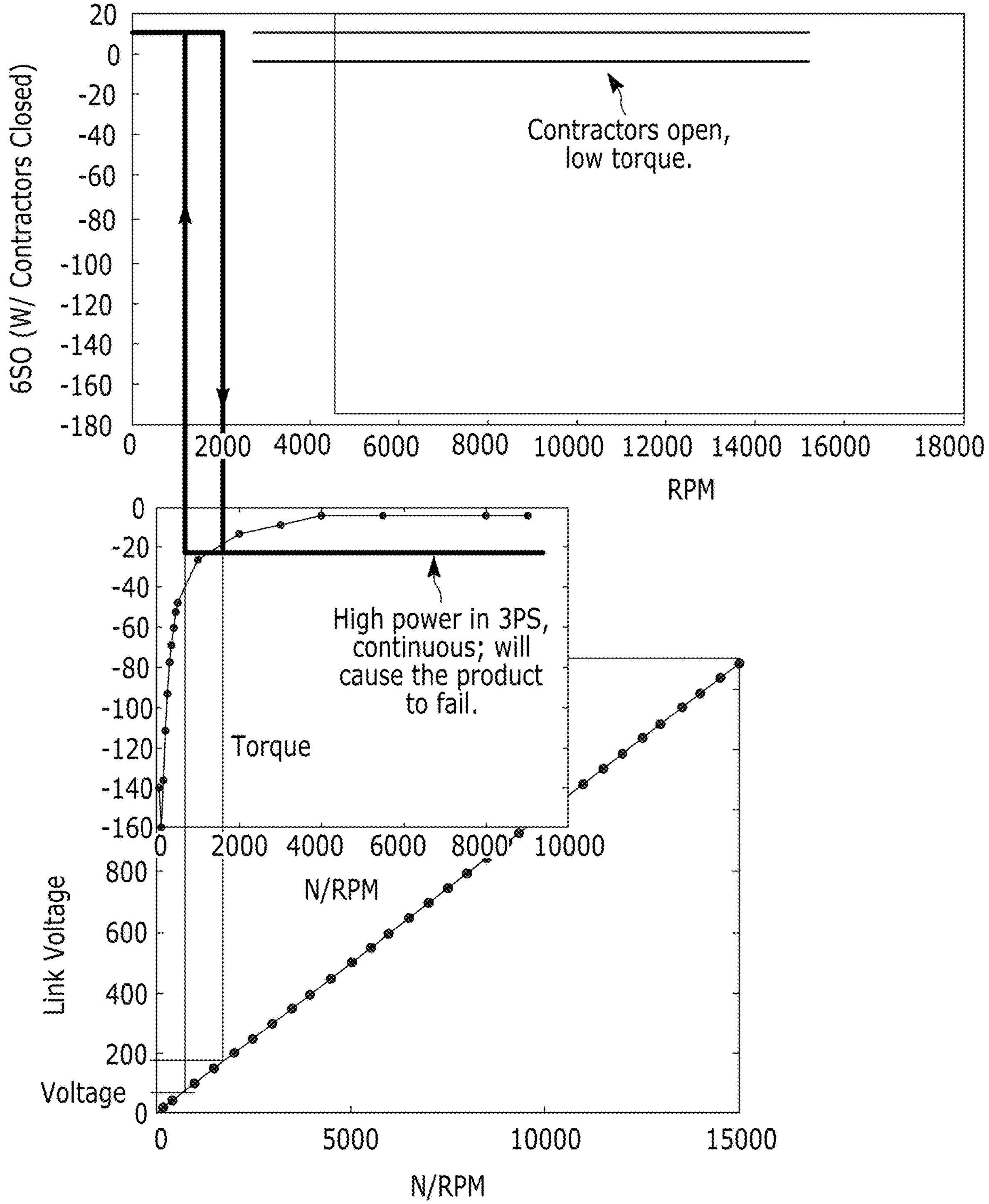
(Prior Art) FIG. 5
FIG. 5 is a is a graph of the operating region curve of a conventional traction inverter for an EV for 3PS or 6SO safe states during emergency towing.

During emergency towing of an EV, the contactors (switches $S_1$ to $S_6$) are open (OFF) and the voltage for the high voltage circuit 11 of the system 10 is generated by the back EMF of the rotating traction motor 20. The low voltage circuit 13 of the system 10 is OFF and the software of microcontroller 16 cannot operate. Only the circuitry powered by the high voltage circuit 11 of the system (by rotating motor 20) can operate. During towing, the motor 20 operates at a continuous speed, but there may not be coolant flow to cool components. With reference to FIG. 5 an operating curve of a conventional traction inverter during emergency towing of an EV is shown by the bold arrowed line. Above 1800 RPM, the system 10 operates in the 3PS safe state. Since high power in the 3PS safe state is continuous, excessive heat may cause the system 10 and/or motor 20 to fail.

Figure 6:
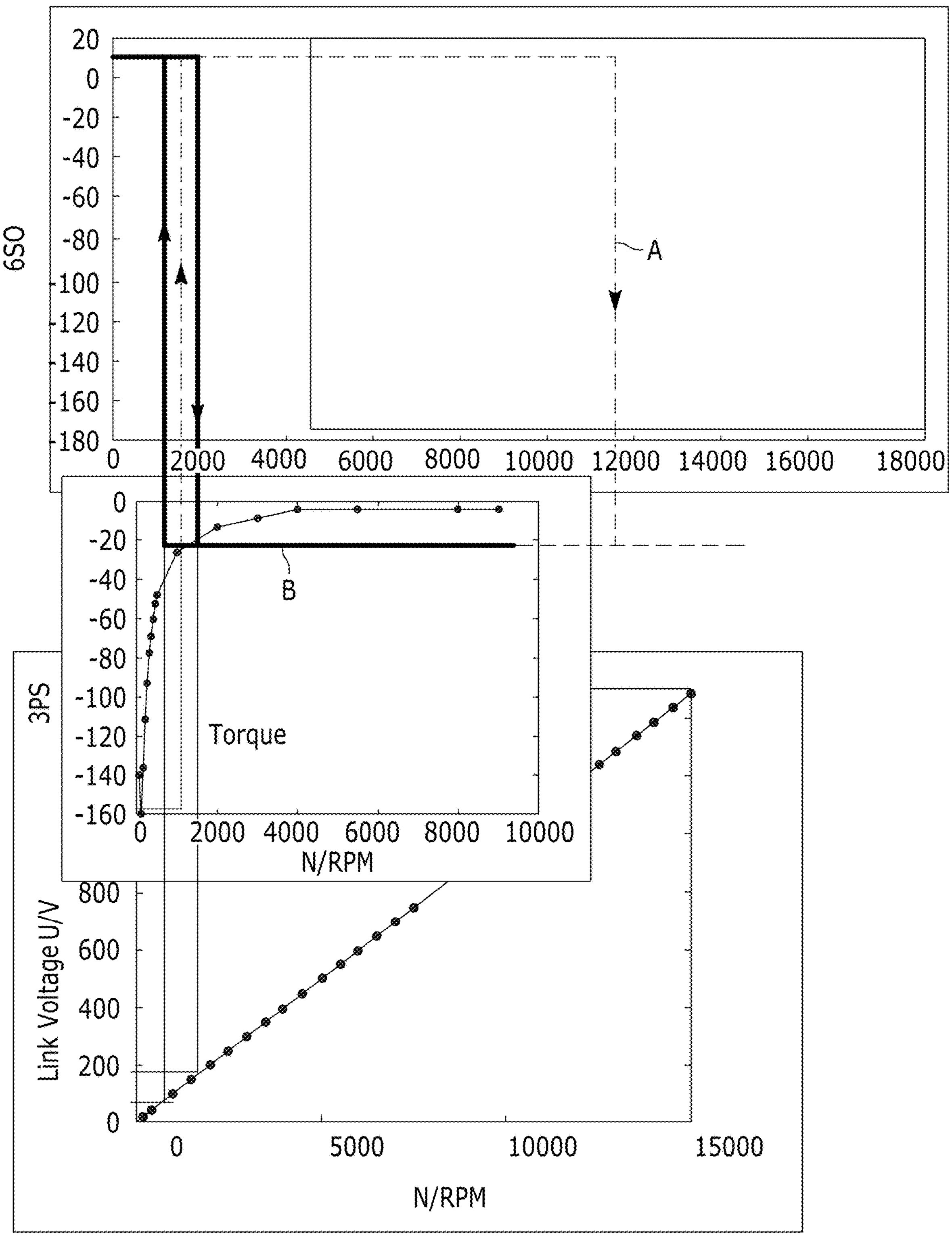
FIG. 6 is a is a graph of the operating region curve of a traction inverter for an EV of the embodiment showing an expanded RPM threshold for the 6SO safe state during emergency towing.

To avoid system failure during emergency towing in the 3PS safe state, in accordance with an embodiment and with reference to FIG. 6, two "curves" are provided. Curve A depicts the emergency tow state and is the default curve (after the vehicle has come to a stop). Curve A (dashed line) thus increases the upper RPM threshold (shown moved to 11000 RPM) proportional with a voltage value just below failure of switches $S_1$ to $S_6$ or failure of capacitor 22. In the emergency tow state, the voltage of the high voltage circuit can be between 0 V (stationary vehicle) and about 1000 V (vehicle towed at high speed). Starting at 0 V and if the voltage of the high voltage circuit remains below about 1000 V, then the state of the switches $S_1$ to $S_6$ will be 6SO safe state, suitable for towing. Towing above 1000 V, is not permitted since then, the state of the switches $S_1$ to $S_6$ will go to the 3PS safe state and will remain there until the voltage is lower than about 386V. As noted above, when in the 3PS safe state while towing, power will be excessive and the switches $S_1$ to $S_6$ and motor 20 are at risk of sustaining damage. In an embodiment, the max permitted voltage during emergency tow is about 562 V.

Thus, the system 10 will not operate in the 3PS safe state during emergency towing, but will operate according to curve A in the 6SO safe state below the upper 11000 RPM threshold (below 1000 V voltage threshold). The hardware of the system 10 latches the emergency tow state upon high voltage switching mode power supply (HVSMPS) power up of the high voltage circuit 11 of system 10. Thus, the system 10 latches the emergency tow state by opening all switches $S_1$ to $S_6$ of the inverter circuit 21 (freewheeling mode). Thus, with curve A state selected, a flat tow of the EV is permitted, enabling towing of the EV with its driven wheels on the roadway. The driven wheels are not controlled, but are forced to rotate when towed. The traction motor 20 connected to the driven wheels will rotate and will generate electricity in the form of voltage.

Curve B of FIG. 6 indicates the motor-driving safe state, which is the same as that in FIG. 5. When power to the low voltage circuit 13 and thus to the microcontroller 16 is returned, the microcontroller 16 determines that the EV is no longer in the emergency tow state and the microcontroller 16 causes exiting of the emergency tow state. The software executed by microcontroller 16 then latches to the safe state curve B prior to driving the motor 20 by changing (e.g., to high) a safe state signal. Thus, once software causes the circuit to latch out of the emergency tow state (curve A), then the curve B is in effect and the system can operate 1) in the 6SO safe state by opening each of the high side switches $S_1$-$S_3$ and each of the low side switches $S_4$-$S_6$ when the motor RPM is less than a first threshold (e.g., below 1000 RPM, 80 V) that is substantially below the emergency tow state RPM threshold (e.g., 11000 RPM, 1000 V), or 2) in the 3PS safe state by opening all of the high side switches $S_1$-$S_3$ and closing all of the low side switches $S_4$-$S_6$, or opening all of the low side switches $S_4$-$S_6$ and closing all of the high side switches $S_1$-$S_3$, when the motor RPM (e.g., above 1800 RPM, 180 V) is greater than the first threshold and less than the emergency tow state RPM threshold. The only way to exit the safe state is to remove power.

The operations and algorithms described herein can be implemented as executable code within the microcontroller 16 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term “circuit” in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. A memory circuit of the microcontroller 16 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of operating an EV (electric vehicle) in one of various states, the method comprising:

providing an inverter control system comprising:

a high voltage circuit powered by a high DC voltage power source;

a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor;

upon powerup of the high voltage circuit and with the low voltage circuit being unpowered, establishing an emergency tow state with each of the high side switches and each of the low side switches being open permitting the EV to be towed without damaging the traction motor;

establishing an emergency tow state RPM threshold, wherein during the emergency tow state, a motor RPM due to rotation of wheels of the EV during towing is less than the emergency tow state RPM threshold;

when the low voltage circuit is powered-up and the microcontroller determines that the EV is no longer in the emergency tow state, exiting the emergency tow state; and after exiting the emergency tow state and prior to driving the traction motor, the microcontroller changing a state of a signal to latch a first safe state by opening each of the high side switches and each of the low side switches when the motor RPM is less than a first threshold that is substantially below emergency tow state RPM threshold, or to latch a second safe state by closing of all of the high side switches with all of the low side switches being open or closing all of the low side switches with all of the high side switches being open, when the motor RPM is greater than the first threshold and less than the emergency tow state RPM threshold.

2. The method of claim 1, further comprising:

latching of the first or second safe state at low negative torque.

3. The method of claim 1, wherein the emergency tow state motor RPM threshold is about 11000 RPM, the first threshold is about 1000 RPM, and, during the second safe state the motor RPM is above 1800 RPM.

4. The method of claim 1, further comprising:

establishing an emergency tow state voltage threshold; and during the emergency tow state, ensuring that a voltage of the high voltage circuit is less than the emergency tow state voltage threshold.

5. The method of claim 4, wherein the emergency tow state voltage threshold is about 1000 V.

6. An inverter control system for an EV (electric vehicle) comprising:

a high voltage circuit powered by a high DC voltage power source;

a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor, wherein:

upon powerup of the high voltage circuit with the low voltage circuit being unpowered, the inverter control system is configured to establish an emergency tow state with each of the high side switches and each of the low side switches being open, with a motor RPM being less than a defined emergency tow state RPM threshold, when low voltage circuit is powered-up, the microcontroller is configured to cause exiting of the emergency tow state when it is determined that the EV is no longer in the emergency tow state, and after exiting the emergency tow state and prior to driving the traction motor, the microcontroller is configured to change a state of a signal to cause latching of a first safe state by opening of each of the high side switches and each of the low side switches when the motor RPM is less than a first threshold that is substantially below the emergency tow state RPM threshold, or to latch a second safe state by closing of all of the high side switches with all of the low side switches being open or closing all of the low side switches with all of the high side switches being open, when the motor RPM is greater than the first threshold and less than the emergency tow state RPM threshold.

7. The system of claim 6, wherein the emergency tow state RPM threshold is configured to be about 11000 RPM, the first threshold is configured to be about 1000 RPM, and, during the second safe state the motor RPM is above 1800 RPM.

8. An inverter control system for an EV (electric vehicle) comprising:

a high voltage circuit powered by a high DC voltage power source;

a low voltage circuit powered by a low DC voltage power source that is substantially less than the voltage of the high voltage power source, the low voltage circuit being configured to power a microcontroller; and an inverter circuit having a plurality of high side switches and a plurality of low side switches, the inverter circuit being configured to deliver AC power to a traction motor, wherein:

upon powerup of the high voltage circuit with the low voltage circuit being unpowered, the inverter control system is configured to establish an emergency tow state with each of the high side switches and each of the low side switches being open, with a voltage of the high voltage circuit being less than a defined emergency tow state voltage threshold;

when low voltage circuit is powered-up, the microcontroller is configured to cause exiting of the emergency tow state when it is determined that the EV is no longer in the emergency tow state, and after exiting the emergency tow state and prior to driving the traction motor, the microcontroller is configured change a state of a signal to cause latching of a first safe state by opening of each of the high side switches and each of the low side switches when a voltage of the high voltage circuit is less than a first voltage threshold that is substantially below the emergency tow state voltage threshold, or latch a second safe state by closing of all of the high side switches with all of the low side switches being open or closing all of the low side switches with all of the high side switches being open, when the voltage of the high voltage circuit is greater than the first voltage threshold and less than the emergency tow state voltage threshold.

9. The system of claim 8, wherein the emergency tow state voltage threshold is about 1000 V, the first voltage threshold is about 80 V, and, during the second safe state the voltage of the high voltage circuit is above about 180 V.

* * * * *